United States Patent
Papenfuss et al.

[15] 3,671,553
[45] June 20, 1972

[54] PROCESS FOR THE PREPARATION OF VERY PURE MONOSULFONIC ACIDS OF TRIPHENYL-METHANE DYESTUFFS

[72] Inventors: Theodor Papenfuss, Niederhofheim/Taunus; Ernst Spietschka, Oberauroff, both of Germany

[73] Assignee: Farbwerke Hoechst Aktiengesellschaft vormals Meister, Lucius & Bruning, Frankfurt/Main, Germany

[22] Filed: April 13, 1970

[21] Appl. No.: 28,153

[30] Foreign Application Priority Data

April 18, 1969 Germany .................. P 19 19 724.1

[52] U.S. Cl. .................................................. 260/392
[51] Int. Cl. .................................................. C09b 11/12
[58] Field of Search .................................... 260/392

[56] References Cited

UNITED STATES PATENTS 538,215   4/1895   Sandmeyer ..................... 260/392

Primary Examiner—Lorraine A. Weinberger
Assistant Examiner—L. Arnold Thaxton
Attorney—Curtis, Morris and Safford

[57] ABSTRACT

Process for the preparation of very pure monosulfonic acids of triphenyl-methane dyestuffs by treating a solution of the appropriate color base with aqueous sulfuric acid, filtering the suspension obtained, treating the filter residue with an inert less polar organic solvent which is not miscible with water, and isolating the color base sulfate or diluting the solution of the color base with an inert less polar organic solvent that is not miscible with water, and then treating it with dilute sulfuric acid, filtering the suspension obtained, treating the filter residue consisting substantially of color base sulfate and amine sulfate, and isolating the color base sulfate.

14 Claims, No Drawings

PROCESS FOR THE PREPARATION OF VERY PURE MONOSULFONIC ACIDS OF TRIPHENYL-METHANE DYESTUFFS

The present invention relates to a process for the preparation of very pure monosulfonic acids of triphenyl-methane dyestuffs.

Monosulfonic acids of triphenyl-methane dyestuffs are of great industrial importance in the production of blue and especially black printing dyestuffs and they are used as pigment powders as well as in the form of various compositions (for example flush pastes).

They are prepared by monosulfonation of the corresponding color bases in sulfuric acid of a determined concentration and temperature. The color bases to be used for the sulfonation are obtained I. by reaction of rosanilines with primary aromatic amines in the presence of acid catalysts, vacuum distillation of the volatile bases contained in the final melt at temperatures of about 150° C and grinding of the cold residual melt (cf. Fierz-David, Kunstl. organische Farbstoffe, 1926, page 262 and BIOS Final Report, 1433, p. 30, 31 and 36.), II. by conversion of the color base hydrochlorides obtainable by treating the dyestuff melt with hydrochloric acid according to I into the free color bases, III. by conversion of color base hydrochlorides or tetrachloro-aluminates obtainable according to German Pat. Nos. 1,098,652, 1,161,370 and 1,161,371 by reaction of 4,4',4''-trichlorotrityl-tetrachloro-aluminate with bases, into the free color bases.

The color bases may be set free from their salts by the two following methods:

a. by treating the salts with alcohol and alkali metal hydroxide solution (cf. Fierz-David, Kunstl. organische Farbstoffe, 1926, page 264) or b. by treating the salts with alkali in the presence of organic bases, whereby the color base is dissolved in the organic phase, and distilling the color base solution in vacuo (cf. BIOS Final Report, 1433, page 32.).

Although direct sulfonation of the color base hydrochlorides prepared according to methods II and III is known from the literature (cf. Fierz-David, Kunstl. organische Farbstoffe, 1926, page 263), it cannot be carried out on an industrial scale since the hydrogen chloride that escapes during the reaction considerably expands the sulfonation melt and causes foaming thereof. The same applies correspondingly to the color base tetrachloro-aluminates.

The above-mentioned methods have several disadvantages:

1. All methods for preparing color bases also provide intermediate and by-products, the majority of which remains in the end product and thus reduces its tinctorial strength. Even the sulfonation eliminates only part of the undesired products.

2. When the volatile constituents of the color base solution are eliminated by distillation in vacuo at temperatures of about 150° C (methods I, IIb and IIIb), the color bases are partially decomposed owing to their poor stability at high temperatures, and colorless or faintly colored decomposition products are formed, the majority of which remains in the dyestuff, even after sulfonation, and thus reduces its tinctorial strength.

3. It is difficult, from the technical point of view, to set free the color bases from their hydrochlorides or tetrachloro-aluminates by means of alcohol and alkali metal hydroxide solution (methods II a and III a), since the free base is obtained as a viscous smeary substance that is difficult to handle. Moreover, this method neither eliminates the impurities due to the synthesis.

4. All methods for preparing the color bases (except method I) require an additional operation since the color base salts have to be reconverted into the color bases suitable for the sulfonation.

5. The preparation of color bases from rosaniline (methods I and II) is not economic since the synthesis of rosaniline provides a yield of only 27 – 35 percent. This low conversion rate requires an extremely complicated purification of the products and a very large reactor volume.

6. Sulfonation of all color bases prepared by the above methods may involve difficulties when high amounts are used. The introduction of the color base into sulfuric acid may easily lead to lump formation. Owing to the resulting unhomogenous sulfonation products, such a lump formation has to be absolutely avoided by exactly controlling and carrying out the sulfonation using relatively small amounts.

7. Considering the color bases obtainable by the above methods, the yield of sulfonated product is unsatisfactory since part of the impurities contained in the color bases remains dissolved in the precipitation liquid.

It is a matter of course that the impurities which are not eliminated during sulfonation give rise to serious disadvantages in the use of the sulfonated dyestuffs, for example: poor tinctorial strength, high viscosity of the flush pastes and printing dyestuffs, low brilliance of the black brightenings, difficulties in the preparation of powders (too great a grain hardness) as well as insufficient splitting off of water in the preparation of flush compositions.

It has now been found that very pure monosulfonic acids of triphenyl-methane dyestuffs of the general formula

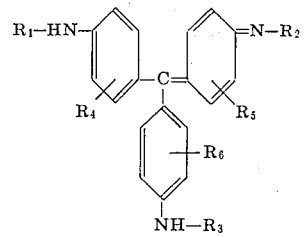

in which $R_1$, $R_2$ and $R_3$ each is hydrogen or a phenyl radical that may carry one or two halogen atoms, alkyl, alkoxy, cyano, carboxylic acid ester and/or carbonamide groups, with the proviso that at least one of the radicals $R_1$, $R_2$ and $R_3$ is phenyl or substituted phenyl, and $R_4$, $R_5$ and $R_6$ each is hydrogen, methyl or ethyl, are obtained a. by treating a solution prepared in usual manner from the color base of the above formula in a primary aromatic amine of the benzene series with excess aqueous sulfuric acid, filtering the suspension obtained, treating the filter residue, after drying, with an inert less polar organic solvent that is not miscible with water, or treating the moist filter residue with the organic solvent mentioned while simultaneously distilling off the water azeotropically, and isolating the color base sulfate, or b. by diluting the solution with an inert less polar organic solvent that is not miscible with water, and then treating it with the theoretical amount of dilute sulfuric acid that is required for converting it into color base sulfate and amine sulfate, filtering the suspension obtained, treating the filter residue that substantially consists of color base sulfate and amine sulfate with water, optionally after having it dried to remove the adherent organic solvent, while simultaneously distilling off azeotropically the remaining organic solvent if necessary, and isolating the color base sulfate, and by converting the color base sulfate thus purified in known manner into the monosulfonic acid by a treatment with sulfuric acid.

According to the process of the invention, the monosulfonic acids of the above-mentioned triphenyl-methane dyestuffs are obtained in an almost quantitative yield. In addition to an excellent purity, the dyestuffs thus prepared have a very high tinctorial strength and are free from the above-described disadvantages inherent in dyestuffs prepared by known processes.

Suitable less polar organic solvents that are inert under the reaction conditions and insoluble in water are generally those having a low dielectric constant, advantageously between about 2 and 10. In some cases, organic solvents having a substantially higher dielectric constant are also suitable. As suitable solvents there may be mentioned: Mono-, di- and trichlorobenzenes, monobromo-benzene, α- and β-chloronaphthalene, nitrobenzene, toluene, dimethylbenzenes, chlorinated aliphatic hydrocarbons, such as methylene chloride, ethylene chloride or tetrachloro-methane, as well as straight-chain and cyclic aliphatic hydrocarbons or mixtures thereof, for example petrol ether, cyclohexane or methylcyclopentane. Among these solvents, monochlorobenzene, o-dichlorobenzene, bromobenzene, nitrobenzene, methylene chloride, ethylene chloride and cyclohexane are especially suitable. Mixtures of these organic solvents may also be used.

By "solvent" there is to be understood an organic liquid that acts as solvent with regard to the free color bases, whereas it has no effect as solvent with regard to water and salts (sulfates of the color bases, inorganic salts).

According to embodiment (a) of the process of the invention, a solution of the free color base, preferably obtained according to method I or IIIb, is advantageously decomposed in primary aromatic amines at temperatures of from 0° to 100° C, preferably from 20° to 60° C, by means of excess aqueous sulfuric acid. In addition to the color base sulfates, sulfates of primary aromatic amines are formed too, which however, contrary to the former ones, remain dissolved in the aqueous sulfuric acid and, therefore, can be separated from the desired color base sulfate. The primary aromatic amines used for dissolving the free color base are, for example, aniline, the toluidines, xylidines or chloro- or bromo-anilines, alkoxy-anilines, such as anisidine or phenetidine, as well as derivatives of aniline-carboxylic acids, such as the alkyl esters or nitriles thereof, preferably primary aromatic amine that corresponds to the color base and is used in an excess for its synthesis. The ratio of color base to amine is advantageously within the range of from about 3 : 1 to 1 : 10, preferably from about 2 : 1 to 1 : 2.

The sulfuric acid used for precipitating the color base sulfate, advantageously, has a concentration of from about 10 to 70 percent, preferably from about 20 to 40 percent. It is used in an excess, i.e. the amount of sulfuric acid used exceeds the amount necessary for the salt formation of all the bases present (color bases and primary aromatic amines). The excess advantageously used is in the range of from 10 to 400 percent, preferably from 50 to 150 percent.

The color base sulfate suspension obtained in this manner is then filtered and the filter cake is the desired color base salt. After having been washed to neutral, it is purified by treating with a solvent in the following manner:

The color base sulfate is dried in vacuo at temperatures of from 50° to 120° C, preferably from about 80° to 90° C, dried, stirred with 3 to 10 times the amount of one of the above-mentioned organic solvents at temperatures of from 0° to 150° C, preferably from 50° to 130° C, filtered, washed with the organic solvent until the filtrate is free from color, and dried in vacuo at 50°–120° C, preferably about 80 to 90° C, or used directly for sulfonation as a filter cake which is moist with solvent.

The purification with solvents can also be effected by stirring the water-moist color base sulfate with 3 to 10 times, preferably 2 to 5 times, the amount of one of the above-mentioned organic solvents and distilling off azeotropically the adherent water in vacuo at temperatures of from about 20° to 85° C, preferably from about 40° to 70° C. Subsequently, the substance is heated to 100° – 150° C (advantageously under normal pressure), filtered hot and treated further as disclosed above.

According to embodiment (b) of the process of the invention, a solution of the free color base, preferably obtained according to method I or IIIb, is advantageously diluted in primary aromatic amines with 3 to 20, preferably 5 to 10, times the amount of an organic solvent defined above. The solution thus obtained is combined with the theoretical amount of dilute sulfuric acid, calculated on the color base to be precipitated as well as primary aromatic amine, at temperatures of from about 30° to 70° C, preferably from about 50° to 65° C, and the whole is stirred for 30 minutes to at most 2 hours, preferably for 45 to 75 minutes, at the above temperature. During this time, the color base sulfate and the sulfate of the primary organic amine precipitate as coarse crystals that can easily be separated by filtration. It is surprising that the whole water of the sulfuric acid is bound by the solid substance so that, after filtration, a purely organic filtrate is obtained in which all impurities of the starting dyestuff are dissolved. For this reason, the remainders of the adherent mother liquor and the impurities dissolved therein can be eliminated by washing the filter cake with one of the above-mentioned organic solvents. Thus, the filter residue is a mixture of color base sulfate, amine sulfate, water and organic solvent.

To fulfill the above conditions, the sulfuric acid used for the precipitation is to have a percentage of from about 20 to 40 percent, preferably from about 30 to 35 percent, of $H_2SO_4$. To remove the sulfates of the primary aromatic amines from the color base sulfate, the moist filter cake is suspended in 2 to 10 times, preferably 3 to 6 times, the amount of water, and the organic solvent adherent to the dyestuff is distilled off azeotropically at temperatures of from about 40° to 100° C, preferably from 70° to 100° C; the amine sulfates enter into solution whereas the color base sulfate remains undissolved. The color base sulfate is then isolated by filtration, washed to neutral with water of about 70° to 100° C and dried in vacuo at temperatures of from about 50° to 120° C, preferably from about 50° to 90° C. It is also possible to liberate the filter cake consisting of color base sulfate and amine sulfate and dried at about 30°–100° C, preferably at about 50°–90° C, from the sulfate of the primary aromatic amines by a treatment with water under the above-mentioned conditions without distilling off the solvent azeotropically.

The color base sulfates obtained in the above manner are monosulfonated in known manner with sulfuric acid which advantageously has a concentration of from about 85 to 100 percent.

In addition to an operation in batches, both embodiments of the invention are excellently suitable for a continuous operation of the process of the invention, since the precipitation of the sulfate of the color base can advantageously be carried out in the absence or presence of less polar organic solvents with the aid of continuously operating mixing devices (for example jet mixer, impeller mixer), a determined residence time achieved by means of a reaction-vessel cascade, followed by a maturing-period and azeotropic distillation, has proved technically suitable, and the good filtration properties of the solid materials prepared according to the process of the invention permit an uncomplicated use of continuously operating filtering devices.

A continuous drying of the color base sulfates does not offer any difficulty to a technical solution.

The process of the present invention permits a technically simple continuous preparation of dyestuffs which are free from any impurity due to a special kind of preparation. This fact can be very distinctly illustrated with the extinction values (tinctorial strengths) of the dyestuffs of the invention, as measured in sulfuric acid solutions, in comparison to dyestuffs obtained by known preparation methods. For this purpose, the free color bases that can, for example, be prepared from the salts by means of alkali metal hydroxide solution and alcohol, are compared with each other in order to eliminate the influence of different dyestuff anions. The following results are obtained:

| Method | | |
|---|---|---|
| I | : | 83% |
| IIa | : | 87% |
| IIb | : | 71% |
| IIIa | : | 79% |
| IIIb | : | 67% |
| Process of the invention | : | 100% |

In addition to this high tinctorial strength, the excellent yield of the products, upon sulfonation of the color base sulfates, is also a criterion for the purity of the dyestuffs of the invention:

| Method | | |
|---|---|---|
| | I | : 87% |
| | IIa | : 89% |
| | IIb | : 84% |
| | IIIa | : 86% |
| | IIIb | : 83% |
| Process of the invention | | : 96 to 98% |

Owing to this high purity of the dyestuffs prepared by the process of the invention, their coloristical properties (especially flush behavior, rheological properties, brilliance of black brightening and soft grain of powders) are far superior to those of the dyestuffs prepared according to methods I to IIIb.

The following examples serve to illustrate the invention, the parts and percentages being by weight unless stated otherwise.

EXAMPLE 1

A solution of 100 parts of the color base of the formula

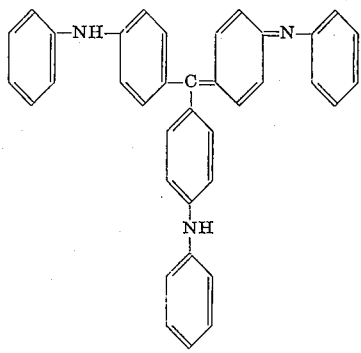

in 100 parts of aniline was heated to 80°–90° C and then, as a thin jet, poured while vigorously stirring into 1,000 parts of 20 percent-sulfuric acid of room temperature. Stirring was continued for 60 minutes, the precipitated color base sulfate was separated from the mother liquor by filtration, washed to neutral with water of 20°–30° C, and the dyestuff sulfate was dried in vacuo at 80°–90° C. Subsequently, the dried dyestuff salt was suspended in 5 times the amount of Ligroin (boiling range of from 90° to 150° C), the suspension was stirred under reflux for 2 hours (110° C), suction-filtered at this temperature, washed with Ligroin until the filtrate was colorless and then dried in vacuo at 50° C. 80 to 83 parts of purified color base sulfate were obtained which, as a free base, had a tinctorial strength that was by 17–20 percent higher than that of the starting base, and which, upon sulfonation in 5 times the amount of 95 percent-sulfuric acid, provided in a yield of 97 to 98 percent a dyestuff which is excellently suitable for the preparation of flush pastes and powders. When using toluene or cyclohexane instead of Ligroin and proceeding as disclosed above, a dyestuff was obtained that is equally valuable and has about the same purity.

EXAMPLE 2

100 parts of a dyestuff of the formula

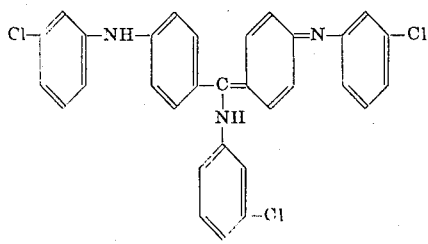

were heated as a 40 percent-solution in 3-chloro-aniline to 120° C, then added while stirring to 500 parts of a 50 percent-sulfuric acid of 50° C, stirring was continued for 15 minutes at 80°–90 C, the solution was filtered and the substance was washed to neutral with water heated to 80°–90° C.

The filter cake was suspended in 1,000 parts of o-dichlorobenzene, and under a pressure of 300 to 400 mm mercury and at a bath temperature of about 80° C, the water adhering to the dyestuff sulfate was distilled off azeotropically. When only pure o-dichlorobenzene passed over, stirring was continued for 2 hours under normal pressure at 120°–130° C, the suspension was filtered hot, washed with o-dichlorobenzene until the filtrate was colorless and dried at 100° C in vacuo. 79 to 81 parts of a dyestuff salt were obtained, which as a free base, had a tinctorial strength that was by 20 percent higher than that of the starting base and which, upon sulfonation in 90 percent-sulfuric acid, was excellently suitable for the preparation of greenish blue dyestuff compositions to be used for intaglio and offset printings. When bromobenzene or ethylene chloride was used instead of o-dichlorobenzene, a dyestuff having a similar purity was obtained.

EXAMPLE 3

A solution of 100 parts of a color base of the formula

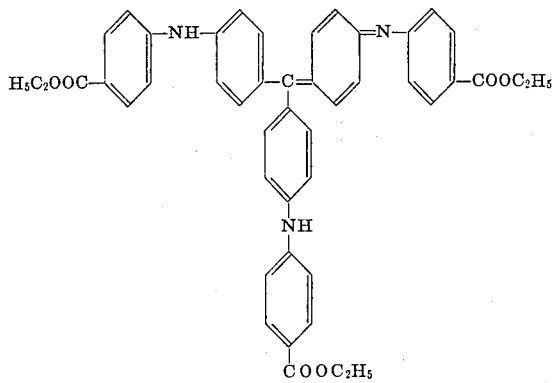

in 500 parts of molten 4-amino-benzoic acid ethyl ester of 100° C was added dropwise, while stirring within 2 hours, to 2,000 parts of 30% $H_2SO_4$ of 30° C. The precipitated blue color base sulfate was separated by centrifuging, washed to neutral with water of 50° C and subsequently suspended in 400 parts of nitrobenzene. The water adhering to the dyestuff was distilled off azeotropically while stirring at 40°–60° C under a pressure of 80 to 150 mm mercury, the mixture was then heated at normal pressure to 150° C for 2 hours, the suspension was pressed on a pressure filter at this temperature, the residue was washed with nitrobenzene of 150° C until the filtrate was colorless and dried in a tumbling drier at 80° C under a pressure of 20–30 mm mercury. In this manner, 75–76 parts of the sulfate of the above dyestuff was obtained which, in the form of the free base, had a tinctorial strength that was by 24 to 25 percent higher than that of the starting product and which, upon sulfonation in 92 percent sulfuric acid, was excellently suitable for commercial use.

When α-or β-chloro-naphthalene or a commercial mixture of the three xylenes is used instead of nitrobenzene while proceeding as described above, a dyestuff of similar yield and quality was obtained.

EXAMPLE 4

100 parts of a color base of the formula

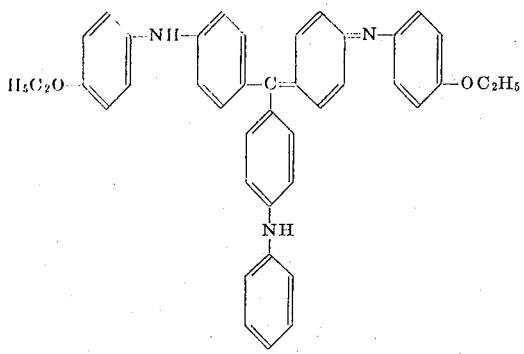

were introduced slowly as a 25 percent-solution in aniline of 20° C into 2,000 parts of 30%-$H_2SO_4$ of 50° C. The precipitate of the color base sulfate was isolated by suction-filtration, washed to neutral on a suction filter with water of 50° C and dried in vacuo at 70°–80° C.

The dry dyestuff was suspended in 8 times the amount of tetrachloromethane, the suspension was refluxed for 5 hours, filtered hot by means of a closed centrifuge and washed with boiling tetrachloromethane until the filtrate was colorless.

The filter cake thus obtained which was moist with solvent could be directly used for sulfonation, the solvent being removed in vacuo during the reaction. 82–85 parts of the monosulfonic acid of the above dyestuff were obtained which was excellently suitable for the preparation of blue brightening colors to be used in printing blacks as well as for powder compositions.

When ethylene chloride, methylcyclohexane or benzene was used instead of tetrachloromethane while proceeding as indicated above, a dyestuff having similar purity and tinctorial strength was obtained.

EXAMPLE 5

100 parts of a color base of the formula

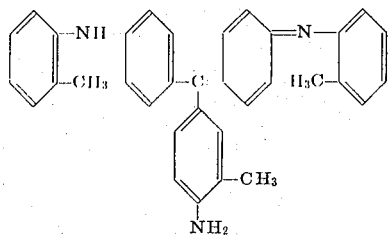

were fed, as a 50 percent-solution in o-toluidine and 1,000 parts of 20 percent-sulfuric acid, both of a temperature of 50° C, by means of two dosing pumps through heated conduits at the above ratio of 1:5 to an impeller mixer in which a homogenous suspension of the precipitated sulfate of the above color base was formed by complete whirl-mixing of the two liquid streams. The continuous suspension stream was conducted to a feed trough of a rotary suction cell filter on which the solid material contained therein was filtered in known manner, washed with water of 70°–80° C and centrifuged off, after having been suction-filtered to dryness. The neutral filter cake was stirred with 5 times the amount of toluene, calculated on the dry material, and the water adhering thereto was removed by azeotropic distillation as disclosed in Example 2. Subsequently, the boiling suspension was filtered on a pressure filter, washed with toluene of 80° to 100° C until the filtrate was colorless and dried in a paddle drier at 110°–120° C.

The quality of the monosulfonic acid prepared from the color base sulfate thus obtained by sulfonation in 96 percent-sulfuric acid was excellent. The dyestuff was especially suitable for the preparation of violet brightening colors to be used in technical-grade blacks and of clear violet intaglio and offset printing compositions.

The yield amounted to 79–81 parts, calculated on 100 parts of blue color base used. The tinctorial strength was 20 percent higher than that of the starting product.

When chlorobenzene or o-xylene was used instead of toluene, a dyestuff of the same quality was obtained.

EXAMPLE 6

100 parts of a color base of the formula

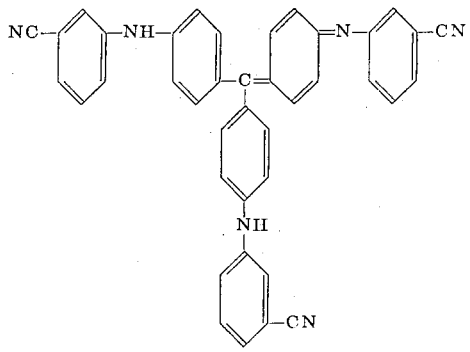

were dissolved in 200 parts of aniline at 80° C (solution I). 1,200 parts of 40% $H_2SO_4$ were heated to 50° C (solution II). The two solutions were fed by means of dosing pumps through insulated conduits at a ratio of 1:4 to a commercial-type jet mixer from which a homogenous precipitated suspension of the sulfate of the above color base was continuously withdrawn. This suspension was conducted to the trough of a rotary piston dosing pump which pressed the dyestuff suspension at a regulated rotation speed onto a continuously operating drum rotary pressure filter where the solid material was filtered, washed to neutral with water of 70° C and blown dry by means of steam of 130° C.

The press cake dropping off the continuously operating filter was continuously mixed in another pump trough with 5 times the amount of chlorobenzene, calculated on the solid material, the resulting suspension containing the solvent was fed to a distilling cascade in the same amount as that of the filter cake dropping off the rotary filter. The dimensions of the cascade were such that its reaction volume corresponded to a residence time of the color base sulfate of from 4 to 6 hours. During this time, the water adhering to the filter cake was distilled off azeotropically at a temperature of from 70° to 85° C under a pressure of from 150 to 250 mm mercury. The suspension leaving the cascade after this residence time was free from water. It was fed to another trough of a rotary piston dosing pump from which it was also pumped at a regulated rotation speed to another continuously operating drum rotary pressure filter where it was washed with chlorobenzene of 80°–90 C until the filtrate was colorless and blown dry by means of nitrogen. The press cake moist with chlorobenzene which had been withdrawn continuously from the filter was sulfonated as such in 93 percent-sulfuric acid in the manner disclosed in Example 4. 77–79 parts of the monosulfonic acid of the above color base were obtained which had a tinctorial strength that was by 21–23 percent higher than that of the starting product, and which was especially suitable for the preparation of reddish blue dyestuff compositions to be used in paper printing. When o-dichloro-benzene or ethylene chloride was used instead of chloro-benzene, a dyestuff was obtained, the important technological properties of which were the same.

EXAMPLE 7

A solution of 100 parts of a color base of the formula

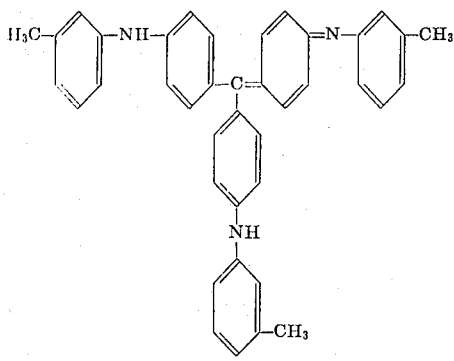

in 80 parts of 3-toluidine was diluted with 400 parts of bromobenzene and the solution was heated to 70° C. Within 5 minutes, 97 parts of 35% H₂SO₄ were added, the mixture was stirred at 70° C until a sample dotted on filter paper and held over concentrated hydrogen chloride did not longer turn blue (20 to 25 minutes). The suspension formed was rapidly suction-filtered, washed with bromobenzene of 50° C until the filtrate was colorless, and then the filter cake consisting of the sulfate of the above color base, 3-toluidinium sulfate, bromobenzene and water was suspended in 800 parts of water. The solvent adhering to the product was distilled off azeotropically under a pressure of 300 mm mercury and at a temperature of about 70° C. The toluidinium sulfate entered into solution whereas the dyestuff sulfate remained undissolved and was isolated by suction-filtration. It was washed to neutral with water of 70° C, dried in a circulating air cabinet at 110° C, and 81–84 parts of a purified color base sulfate were obtained, the tinctorial strength of which, measured as a free base in H₂SO₄-solution, was by 18–20 percent higher than that of the color base used.

After sulfonation in 89% H₂SO₄, a monosulfonic acid of the dyestuff was obtained which was excellently suitable for the preparation of greenish blue printing colors, both in the flushed form and for powder compositions.

When methylene chloride or methyl-cyclopentane was used instead of bromobenzene, a dyestuff of a similar purity was obtained.

EXAMPLE 8

100 parts of a color base of the formula

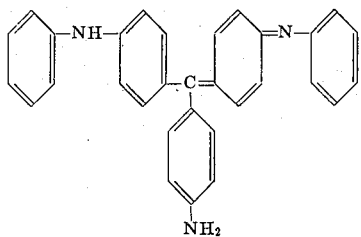

were dissolved in 50 parts of aniline and 800 parts of ethylene chloride. The solution was heated to 50° C and, within 20 minutes, 197.5 parts of 20% H₂SO₄ were added dropwise and stirred at 50° C until the test sample disclosed in Example 7 indicated a complete precipitation of the dyestuff sulfate which was filtered by means of a pressure filter, washed with ethylene chloride of room temperature until the filtrate was colorless, and dried in vacuo at 50° C. The dry solid material obtained consisted of the color base sulfate and aniline sulfate. This was removed by stirring it with 500 parts of water of 95° C, the mixture was filtered, washed to neutral with water of 95° C and dried in a circulating air cabinet at 100°–130° C.

85–89 parts of sulfate of the above color base were obtained, the extinction of which, measured in H₂SO₄, exceeded that of the color base used by 18–21 percent. After sulfonation the dyestuff was especially suitable for preparing pure reddish blue brightening colors to be used in printing blacks.

When petrol ether (boiling range of from 90° to 120° C) or benzene was used instead of ethylene chloride, a dyestuff of similar quality was obtained.

EXAMPLE 9

A solution of 100 parts of a color base of the formula

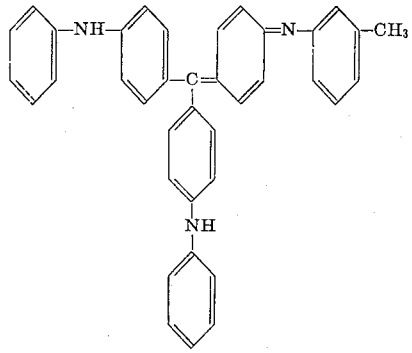

in 38 parts of aniline was diluted with 450 parts of chlorobenzene (solution I). As a precipitating solution (II) 104 parts of 35% H₂SO₄ were used.

The two solutions were fed at a ratio of 5.65:1 by means of dosing pumps to a stirrer mixer regulated by thermostat to 60°–70 C by means of a hot-water-circulation heating. The overflow vessel of the mixer was connected to a cascade formed by three vessels provided with stirrers. This cascade was also heated to 60°–70° C by means of a hot water heating. Its reaction volume was such that the product flowing over from the mixer resided therein for 50 to 60 minutes. The formation of the dyestuff suspension which had begun in the mixer was complete after the passage through the cascade. This was continuously checked by taking a sample from the suspension which left the last cascade vessel, and testing it in the manner disclosed in Example 7. The freely overflowing sulfate suspension was conducted to a trough from which a rotary piston pump conveyed the same amount to a continuously operating drum rotary pressure filter as it received from the cascade. On the rotary filter the residue was also continuously washed with chlorobenzene of room temperature until the filtrate was colorless, then blown dry by means of nitrogen, and the press cake dropping off the filter was pasted up into a pumpable suspension in a continuously operating mashing device with 4 times the amount of water of 90° C (calculated on the color base used). This suspension was conducted to another pump trough from which another rotary piston pump conveyed the dyestuff suspension to a connected distilling cascade at such a rate that the liquid level in the pump trough remained constant. The reaction volume of the cascade had to assure a residence time of the suspension of from 4 to 6 hours. During this time, chlorobenzene adhering to the press cake was distilled off azeotropically by blowing in steam. The suspension leaving the cascade after this time was free from chlorobenzene. It was conducted to the trough of a third rotary piston pump which conveyed it, while checking its level, to another continuously operating drum rotary pressure filter where the solid material was separated from the filtrate, washed with water of 90° C and blown dry by means of low-pressure steam. After homogenization in a paste mixer the continuous product stream leaving the filter was conducted to a continuously operating disk drier in which it was dried at 100°–110° C to a residual moisture of 0.2 percent. 80–82 parts of a purified dyestuff sulfate were obtained, the free base of which had a tinctorial strength that was by 30 percent higher than that of the initial base. After monosulfonation the dyestuff was excellently suitable for the preparation of reddish blue printing inks that are especially demanded for the brightening of blacks used in industry.

When chlorobenzene was replaced by toluene or trichloroethylene and the reaction was carried out as disclosed above, a dyestuff of a similar purity was obtained.

EXAMPLE 10

A solution of 100 parts of a color base of the formula

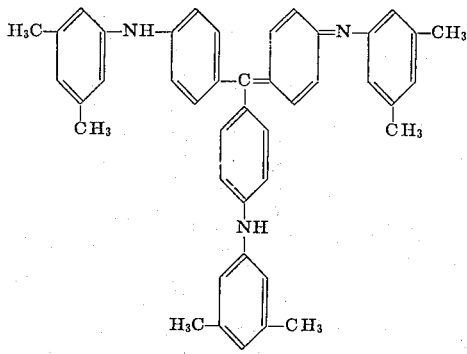

in 120 parts of sym.-m-xylidine was diluted with 580 parts of nitrobenzene. The solution was heated to 50° C and then 143 parts of 40% $H_2SO_4$ were added within 45 minutes, the mixture was stirred at 50° C until a sample placed on filter paper did no longer turn blue in an acid atmosphere (conc. HCl) (30 to 35 minutes), the mixture was quickly filtered, the residue was washed with nitrobenzene of 50° C until filtrate had a faint color.

The filter cake moist with solvent was stirred into a homogenous suspension (1,943 parts) with 10 times the amount of water of 90° C, calculated on the color base used. 50 parts of this suspension were conducted per hour by means of a rotary piston pump to a continuously operating distilling cascade having a total capacity of 300 parts by volume, so that the medium residence time of the suspension in the cascade was 6 hours. In the cascade nitrobenzene adhering to the filter cake was driven off with direct steam. At the end of the cascade a continuous stream of color base sulfate suspension which was free from the solvent was withdrawn, filtered, after intermediate mashing, by means of two decanting centrifuges connected in series, and washed to neutral. The substance was dried at 120° C in a circulating air cabinet, and 84–85 parts of a purified color base sulfate were obtained, the free base of which in $H_2SO_4$ had a tinctorial strength that was by 22–23 percent higher than that of the initial dyestuff, and the monosulfonic acid of which, obtained by sulfation in 92% $H_2SO_4$, was excellently suitable for the preparation of greenish blue flush pastes and powder compositions.

When 1,2,4-trichlorobenzene or a technical-grade trichlorobenzene- or xylene mixture was used instead of nitrobenzene, a dyestuff of the same quality was obtained.

EXAMPLE 11

100 parts of a color base of the formula

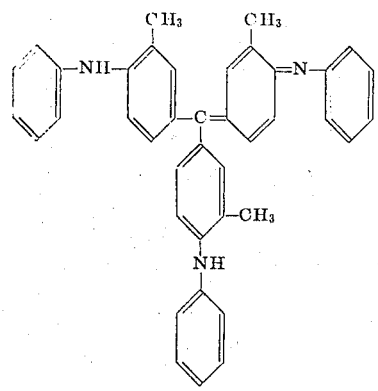

were diluted as a 60 percent solution in aniline with 2,000 parts of cyclohexane (solution I). For the precipitation 138 parts of 35%-$H_2SO_4$ (solution II) were used.

The two solutions were continuously mixed at a ratio of 15:1 by means of dosing pumps, as disclosed in Example 9. The sulfate of the above color base precipitated together with the aniline sulfate. The suspension which had been conveyed through a cascade that ensured an exact residence time was filtered on a solvent-tight continuously operating drum filter, washed with cyclohexane and blown dry by means of nitrogen.

The whole filter cake was stirred with 500 parts of water in a vessel provided with stirrer, the paste was heated to 70°–80° C, and cyclohexane adhering to the product was distilled off azeotropically. The product was filtered by means of a pressure filter, washed to neutral with water of 80° C and dried in vacuo at 60°–80° C.

85–87 parts of color base sulfate were obtained. The tinctorial strength of its free base, measured in $H_2SO_4$, was by 20–22 percent higher than that of the initial product.

The monosulfonic acid prepared by sulfonation with 95%-$H_2SO_4$ is an especially suitable starting product for preparing varnish and powder compositions of reddish blue printing dyestuffs.

We claim:

1. A process for the preparation of very pure monosulfonic acids of a triphenyl methane dyestuff of the formula

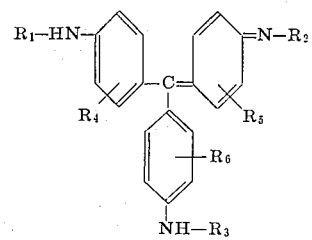

wherein $R_1$, $R_2$ and $R_3$ each is hydrogen, phenyl or phenyl mono- or di-substituted by halogen, alkyl, alkoxy, cyano, carboxylic acid ester or carbamide, provided that at least one of said $R_1$, $R_2$ and $R_3$ is phenyl or substituted phenyl, and $R_4$, $R_5$ and $R_6$ each is hydrogen, methyl or ethyl, which process comprises adding at a temperature between 0° and 100° C. an excess of aqueous sulfuric acid to a solution of the color base of the above formula prepared in a primary aromatic amine of the benzene series, filtering the suspension obtained, stirring the filter residue, after drying, at a temperature of between 0° and 150° C. with an inert less polar organic solvent which is not miscible with water, isolating the color base sulfate and finally converting the color base sulfate thus purified into monosulfonic acid by treatment with sulfuric acid.

2. A process as claimed in claim 1 which comprises stirring the filter residue without prior drying at a temperature between 20° and 85° C. with the inert less polar organic solvent while simultaneously distilling off the water azeotropically, subsequently heating to a temperature of between 100° and 150° C., filtering while hot, isolating the color base sulfate and finally converting the color base sulfate thus purified into monosulfonic acid by treatment with sulfuric acid.

3. A process as claimed in claim 1 which comprises diluting the solution of the color base with an inert less polar organic solvent that is not miscible with water, treating it at a temperature between 30° and 70° C. with the theoretical amount of dilute sulfuric acid necessary for the conversion into the color base sulfate and amine sulfate, filtering the suspension obtained, treating the moist filter residue with water at a temperature between 40° and 100° C. while simultaneously distilling off the remaining organic solvent azeotropically or first drying the moist filter residue and then treating it with water under the above cited conditions, isolating the color base sulfate and finally converting the color base sulfate thus purified into monosulfonic acid by treatment with sulfuric acid.

4. A process as claimed in claim 1, wherein a solution of the color base in such an aromatic amine is used as corresponds to the primary aromatic amine used for the preparation of the color base.

5. A process as claimed in claim 1, wherein a compound of the following formula

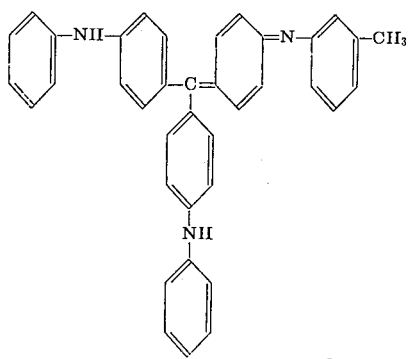

is used as color base.

6. A process as claimed in claim 1, wherein ligroin is used as inert less polar organic solvent.

7. A process as claimed in claim 1, wherein dichlorobenzene is used as inert less polar organic solvent.

8. A process as claimed in claim 1, wherein nitrobenzene is used as inert less polar organic solvent.

9. A process as claimed in claim 1, wherein tetrachloromethane is used as inert less polar organic solvent.

10. A process as claimed in claim 1, wherein toluene is used as inert less polar organic solvent.

11. A process as claimed in claim 1, wherein chlorobenzene is used as inert less polar organic solvent.

12. A process as claimed in claim 1, wherein bromobenzene is used as inert less polar organic solvent.

13. A process as claimed in claim 1, wherein ethylene chloride is used as inert less polar organic solvent.

14. A process as claimed in claim 1, wherein cyclohexane is used as inert less polar organic solvent.

* * * * *